US008996542B2

(12) United States Patent (10) Patent No.: US 8,996,542 B2
Gourdol et al. (45) Date of Patent: Mar. 31, 2015

(54) NAVIGATION OF HIERARCHICAL DATA SETS

(75) Inventors: Arno Gourdol, San Francisco, CA (US); Wade Heninger, Preston, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1295 days.

(21) Appl. No.: 11/610,463

(22) Filed: Dec. 13, 2006

(65) Prior Publication Data

US 2013/0124528 A1 May 16, 2013

(51) Int. Cl.
 *G06F 17/30* (2006.01)
(52) U.S. Cl.
 CPC ...... *G06F 17/3007* (2013.01); *G06F 17/30112* (2013.01); *G06F 17/30106* (2013.01)
 USPC ............ 707/754; 715/273; 715/810; 715/853
(58) Field of Classification Search
 CPC .................. G06F 17/30126; G06F 17/30554; G06F 17/3056; Y10S 707/99931; Y10S 715/968
 USPC .......................... 707/104.1, 200, 75, 999.001
 See application file for complete search history.

(56) References Cited

U.S. PATENT DOCUMENTS

| 8,037,104 | B2* | 10/2011 | De Vorchik et al. | 707/802 |
|---|---|---|---|---|
| 8,909,656 | B2* | 12/2014 | Kumar et al. | 707/754 |
| 2001/0039546 | A1* | 11/2001 | Moore et al. | 707/10 |
| 2002/0175955 | A1 | 11/2002 | Gourdol et al. | |
| 2003/0065673 | A1* | 4/2003 | Grobler et al. | 707/100 |
| 2004/0193594 | A1* | 9/2004 | Moore et al. | 707/4 |
| 2005/0166156 | A1* | 7/2005 | Frigon et al. | 715/764 |
| 2005/0223024 | A1* | 10/2005 | Hyun et al. | 707/102 |
| 2006/0161867 | A1* | 7/2006 | Drucker et al. | 715/810 |
| 2009/0265370 | A1* | 10/2009 | Rucker et al. | 707/102 |

OTHER PUBLICATIONS

Picasa;"http://picasa.google.com/"; Sep. 15, 2006.*
iView MediaPro 3, http://www.iview-multimedia.com/mediapro/3_search. php, 2006 Microsoft Corporation, Sep. 18, 2006, pp. 1-3.

* cited by examiner

*Primary Examiner* — Dennis Truong
(74) *Attorney, Agent, or Firm* — Wolfe-SBMC (57) ABSTRACT

Briefly, in accordance with one or more embodiments, a hierarchical data set may be displayed in a database view in a content window of a program or graphical user interface. A filter panel may display one or more categories of information about the hierarchical data set including one or more filterable items that may be selected by a user. In response to a user selection, filtered contents of the hierarchical data set may be displayed in the database view according to the selection to allow a user to navigate the hierarchical dataset via the database view. In one or more embodiments, the hierarchical data set may comprise a file system.

27 Claims, 4 Drawing Sheets

NAVIGATION OF HIERARCHICAL DATA SETS

BACKGROUND

There are typically two approaches to navigating large stores of data, hierarchical navigation or query-based navigation. In the former, the data items are organized in an arbitrarily deep tree or other graph structure, with a given item having a parent and one or more children. This approach allows users to choose which categories to use, for example the directories in which the files are stored and how to relate them to each other. Such an arrangement makes it easy to assign and change the category to which an item pertains for example by moving it. However, it is difficult for an item to belong to multiple categories, although some solutions to this problem have been proposed such as the use of links, aliases and shortcuts. Another drawback normally associated with hierarchical navigation method is the difficulty to take advantage of the intrinsic metadata that may be associated with an item. Furthermore, extrinsic type metadata other than the filename are difficult to use for navigation. In the typical database type approach, a record may correspond to an item in the data set, and various metadata properties are indexed. A user can then issue a query of the database to select an appropriate subset of records. However, with such an approach the user no longer has the benefits of the structural relationship among items that is made possible by a hierarchical organization of a hierarchical data set.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of processes, programs and/or symbolic representations of operations on data bits and/or binary digital signals within a computer memory, for example. These process descriptions and/or representations may include techniques used in the data processing arts to convey the arrangement of a computer system and/or other information handling system to operate according to such programs, processes, and/or symbolic representations of operations.

A process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device, computing platform, and/or other information handling system.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In one or more embodiments, an object may refer to an item that may be selected and/or manipulated, for example shapes, pictures, images, text, and/or text boxes that may appear on a display as rendered by a computing platform coupled to the display. In one or more embodiments, the term render may refer to displaying an object on a display coupled to a computing platform, and/or to manipulating the object on the display. In one or more embodiments, graphic may refer to a pictorial and/or image representation of an object, and in one or more alternative embodiments may refer to an object itself. In one or more embodiments, a graphic element may be single and/or fundamental graphic object, and/or a portion thereof. In one or more embodiments, a letterform may be a shape and/or design of a letter of an alphabet. In one or more embodiments, a font may refer to a design for a set of characters and/or letters for printing and/or displaying. In one or more embodiments, text may refer to letters and/or characters that may be manipulated and/or combined as words, lines, and/or pages. However, these are merely example definitions of the above terms, phrases, and/or concepts wherein other definitions may apply as well, and the scope of claimed subject matter is not limited in these respects. In one or more embodiments, to parse may refer to dividing computer code into elements that can be analyzed and/or identified. In one or more embodiments, file may refer to a collection of data, code, instructions, and/or other information that may be readable, accessible, and/or able to be acted on by a computing platform and/or the like. In one or more embodiments, a format may refer to a predefined organizational structure for data, code, instructions, and/or other information that may be readable, accessible, and/or able to be acted on by a computing platform and/or the like.

In one or more embodiments, a graphical user interface (GUI) may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of in a graphical user interface. In one embodiment, content reflow may refer to where the contents of a document may be rearranged to alter the layout, order, and/or readability of the content of the document. In one or more embodiments, transient may refer to being in a state for a brief and/or temporary period of time, and/or passing with time and/or a temporary state of being. In one or more embodiments, an icon may refer to a smaller sized picture that may represent an object, a file, and/or a program, and in some embodiments, an icon may be a thumbnail, wherein a thumbnail may refer to a smaller sized image and/or picture of an object, a file, and/or a program, and/or a portion thereof. However, these are merely example definitions of terms relating to graphical user interfaces and/or computing platforms and/or the like, and the scope of claimed subject matter is not limited in this respect.

In one or more embodiments, a database may refer an organization of information created, stored, accessed, edited, and/or otherwise utilized by a computing platform. In one or more embodiments, a tag may refer to a command contained in a file, object, and/or document that may specify how the file, object, and/or document, and/or a portion thereof, may be formatted. In one or more embodiments, metadata may refer to information pertaining to data contained in a file, object, and/or document, for example formatting information, date of creation, date of editing, date saved, how data was obtained, and/or from where data was obtained. Such metadata, for example, may be utilized in for database management purposes and/or for data warehousing of multiple databases, although the scope of claimed subject matter is not limited in this respect. In one or more embodiments, an application programming interface (API) may refer to a set of routines, protocols, and/or tools utilized to cause a program to operate in conjunction with an operating system. In one or more embodiments, an operating system may refer to a program to execute on a computing platform to handle input and/or output commands, file management, printing, displaying, storing, and/or communicating of information for the computing platform. However, these are merely examples of database and/or operating system functions, and the scope of claimed subject matter is not limited in these respects.

In one or more embodiments, a hierarchical data set may refer to a set of data items, such as files and/or directories, organized hierarchically. For example a file system may be an example of a hierarchical data set. In one or more embodiments, metadata may refer to information about data items contained in a hierarchical data set or the like. For example, metadata may comprise a filename, a date of creation, an author and/or a set of keywords. Some metadata may reflect information specific to the type of item, for example width, height and/or orientation for a graphical document and/or tempo or key for an audio recording. In one or more embodiments, intrinsic metadata may refer to information about an item that may be associated to an item by its very nature. For example intrinsic metadata of an image may include width and/or height of the image. In one or more embodiments, extrinsic metadata may refer to information about an item associated by a user, such as a list of keywords, a rating or comments. However, these are merely examples of hierarchical data sets, metadata, intrinsic metadata, and/or extrinsic metadata, and the scope of the claimed subject matter is not limited in these respects.

Figure 1:
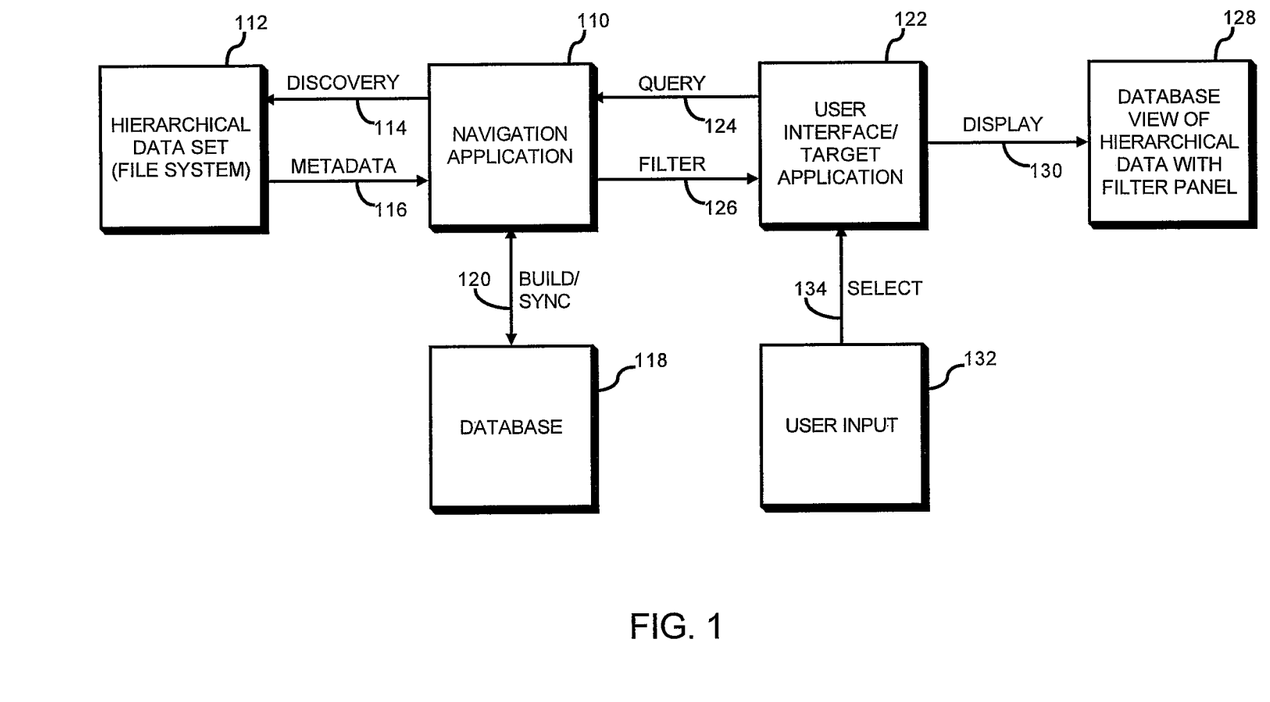
FIG. 1 is a block diagram of navigation of a hierarchical data set with a navigation application or the like in accordance with one or more embodiments.

Referring now to FIG. 1, a block diagram of navigation of a hierarchical data set with a navigation application or the like in accordance with one or more embodiments will be discussed. As shown in FIG. 1, a navigation application 110 may be capable of allowing a user to navigate hierarchical data set 112 using a database type view of the hierarchical data set. In one or more embodiments, hierarchical data set 112 may comprise a file system such as a file system of an operating system, although the scope of the claimed subject matter is not limited in this respect. In one or more embodiments, navigation application 110 may perform a discovery operation 114 on hierarchical data set 112 to discover one or more features of and/or information pertaining to hierarchical data set 114 that may be utilized for navigation of data in hierarchical data set. In one or more embodiments such features and/or information may comprise metadata or the like. Such metadata may be obtained from hierarchical data set 112 at operation 116, and navigation application may build and/or synchronize database 118 via operation 120 based on an analysis of one or more files of hierarchical data set 112. In general, database 118 may be accessed which may include building database 118 if database 118 does not yet exist, and/or may include synchronizing database 118 if database 118 already exists, and/or may include accessing database 118 without performing or requiring synchronization of database 118, although the scope of the claimed subject matter is not limited in these respects.

Database 118 may then be utilized by user interface 122 to display database view 128 of hierarchical data set 112 via display operation 130. As a result, user interface 122 may allow a user to view information in hierarchical data set 112 in a database view. In one or more embodiments, user interface 122 may be a user interface of an operating system in which a user may view files and/or folders of information stored on a computing platform on which the operating system is running. In such embodiments, the files and/or folders may be organized as hierarchical data set 112 which in this case may comprise the file system of the operating system. Thus, navigation application 110 may allow a user to view and/or navigate the files and/or folders of the file system as a database view via database view 128 rather than viewing and/or navigating of the files/and or folders via a hierarchical viewing and/or navigating system. In one or more embodiments, user interface 122 may comprise a target application executing on the operating system that uses a user interface to view and/or navigate hierarchical data set 112 from within the program. Such a program may comprise, for example, Adobe® Photoshop®, or the like type of application, available from Adobe Systems Incorporated of San Jose, Calif., USA, although the scope of the claimed subject matter is not limited in this respect. In one or more embodiments, navigation application 110 may be stand alone application, applet, and/or servlet, or the like, or alternatively may be part of another program, at least partially or a module, service, and/or object thereof or the like. For example, navigation application 110 may be part of an operating system or may be part of a user interface or target application 122. However, these are merely examples of where and/or how navigation application 110 may be tangible embodied, and the scope of the claimed subject matter is not limited in this respect.

In one or more embodiments, a user may navigate hierarchical data set 112 via database view 128 of hierarchical data set 112. In one or more embodiments, database view 128 of hierarchical data 128 may comprise a filter panel with which a user may navigate information contained in hierarchical data set 112. A user input 132 may be provide to user interface 112 at select operation 134 in which a user may select to filter the information displayed in database view 128 of hierarchical data set 112. Such a user input 132 may allow the user to find information in hierarchical data set 112 that meet one or more criteria of a query. In response to user input 132, user interface 122 may query navigation application 110 to filter information in database 118 that meet the one or more criteria of query 124. As a result, user interface 122 may then provide filtered information via filter operation 126 to user interface 122 such that database view 128 of hierarchical data 112 displays filtered information meeting the one or more criteria of query 124. Using one or more query operations 124 and resulting filter operations 126, the user may view and/or navigate information in hierarchical data set 112 so that only information, files, folders, and so on, that meet the one or more criteria may be displayed in database view 128 of hierarchical data set 112. The filter panel with which the user may provide such queries to filter the information is shown in and further discussed with respect to FIG. 2.

Figure 2:
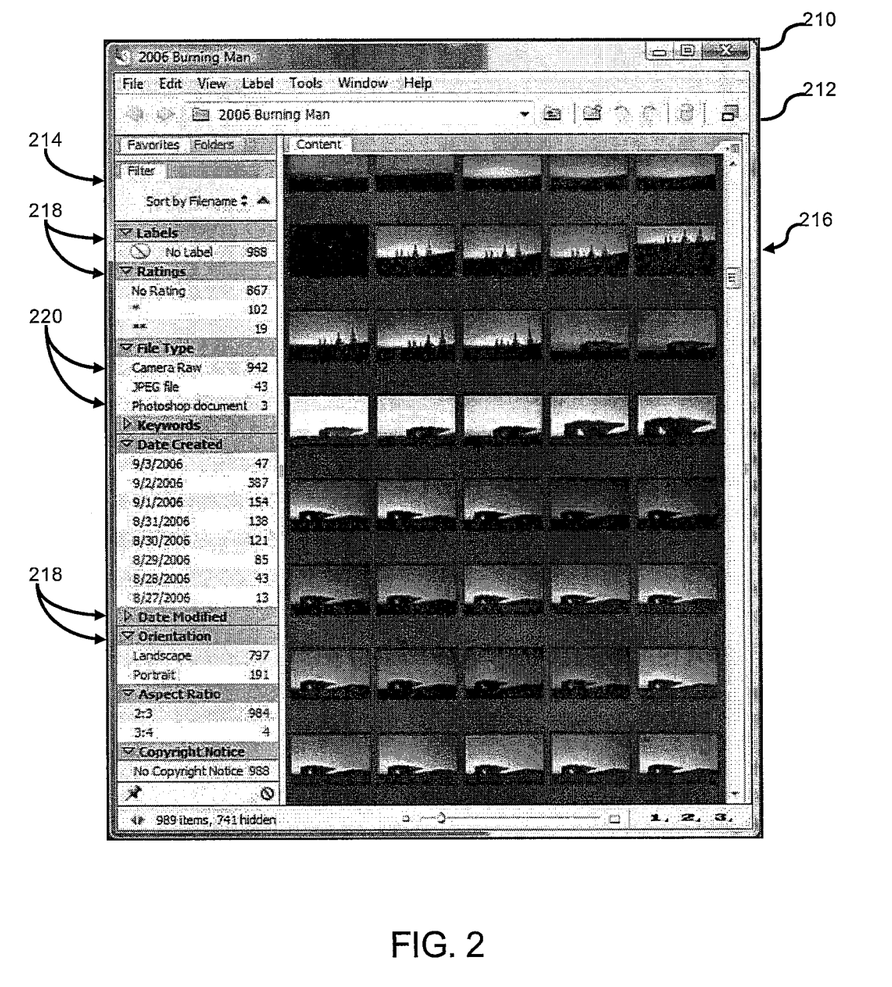
FIG. 2 is a diagram of an application having a user interface capable of allowing viewing and/or navigation of a hierarchical data set or the like in accordance with one or more embodiments.

Referring now to FIG. 2, a diagram of an application having a user interface capable of allowing viewing and/or navigation of a hierarchical data set or the like in accordance with one or more embodiments will be discussed. In the particular embodiment as shown in FIG. 2, application 210 may comprise graphical user interface 212 capable of allowing a user to view, navigate, and/or manipulate information in hierarchical data set 112. In one or more embodiments, graphical user interface 212 may correspond to user interface 122 of FIG. 1, and application 210 may correspond to the target application, which in the embodiment shown may comprise Adobe® Photoshop® or a similar program, although the scope of the claimed subject matter is not limited in this respect.

In one or more embodiments, graphical user interface 212 of application 210 may include filter panel 214 that may allow a user to navigate information of hierarchical data set 112 that may be displayed in a content window 216 of application 210. Such a filter panel 214 may operate as a navigation tool that is capable of allowing a user to apply a filter operation 126 to hierarchical data set 112 while browsing hierarchical data set 112 represented as database view 128 of hierarchical data set 112. The content of filter panel 214 may be determined dynamically based at least in part on the contents of the hierarchical data set 112 being navigated via application 210. Filter panel 214 may contain multiple categories 218 based on an analysis of the files contained in the current hierarchical data set with which database 118 was generated. As shown in FIG. 2, hierarchical data set 112 may comprise a folder of image files. In such an example, categories 218 may comprise various attributes of the image files based at least in part on metadata contained in the image files. For example, categories 218 may comprise labels, ratings, file type, keywords, date created, date modified, orientation, aspect ratio, copyright notice, and/or any other type of information and/or metadata that may be associated with an image file. In the event where the files are audio files instead of image files, categories 218 may comprise rating, keywords, file format, date created, tempo, and/or any other type of information and/or metadata that may be associated with an audio file. Categories 218 of filter panel 214 may be dynamically generated and based at least in part on metadata obtained at process 116 on the particular type of files that may be present in hierarchical data set 112. If there are no files having a particular category 218, that particular category may not be displayed in filter panel 214. For example, if there are no audio recordings contained within hierarchical data set 112, the tempo category may not be shown. For one or more of categories, one or several filter items 220 may be determined based at least in part on the value of one or more specific metadata properties. In some cases some or all of the retrieved values may be indicated, for example in the case of keywords. In other cases, the values may be grouped, for example all files modified on the same date. For one or more of the filter items 220, the specific items matching a particular filter item may be recorded, and the number of corresponding items may be displayed. The user may then select, for example using a mouse or mouse-type input, one or more filter items 220. For example, if the user selects the filter item "JPEG file" in the "File Type" category, only items of this file type may be displayed in content window 216. Further filtering using categories 218 and filter items 220 may allow the user to further navigate among the items contained in hierarchical data set 112, and the corresponding items meeting the requirements of such queries 124 may be displayed in content window 216 accordingly. In or more embodiments, hierarchical data set may comprise one or more subdirectories or trees in which items may be stored and organized. For example, in a file system embodiment, one or more folders may contain one or more subfolders. In accordance with such an embodiment, program 210 may be capable of displaying all such items of hierarchical data set 112 within a single content window 216 without requiring the display of the subfolders for navigation. In other words, the hierarchical structure of hierarchical data set 112 may be "flattened out" such that, at least initially for example, all or nearly all of the files in hierarchical data set 112 may be simultaneously displayed in content window 216, for example all or nearly all of the contents of the folders and subfolders in a certain directory. However, this is merely one example of how items in hierarchical data set 112 may be displayed in content window 216, and the scope of the claimed subject matter is not limited in this respect.

Figure 3:
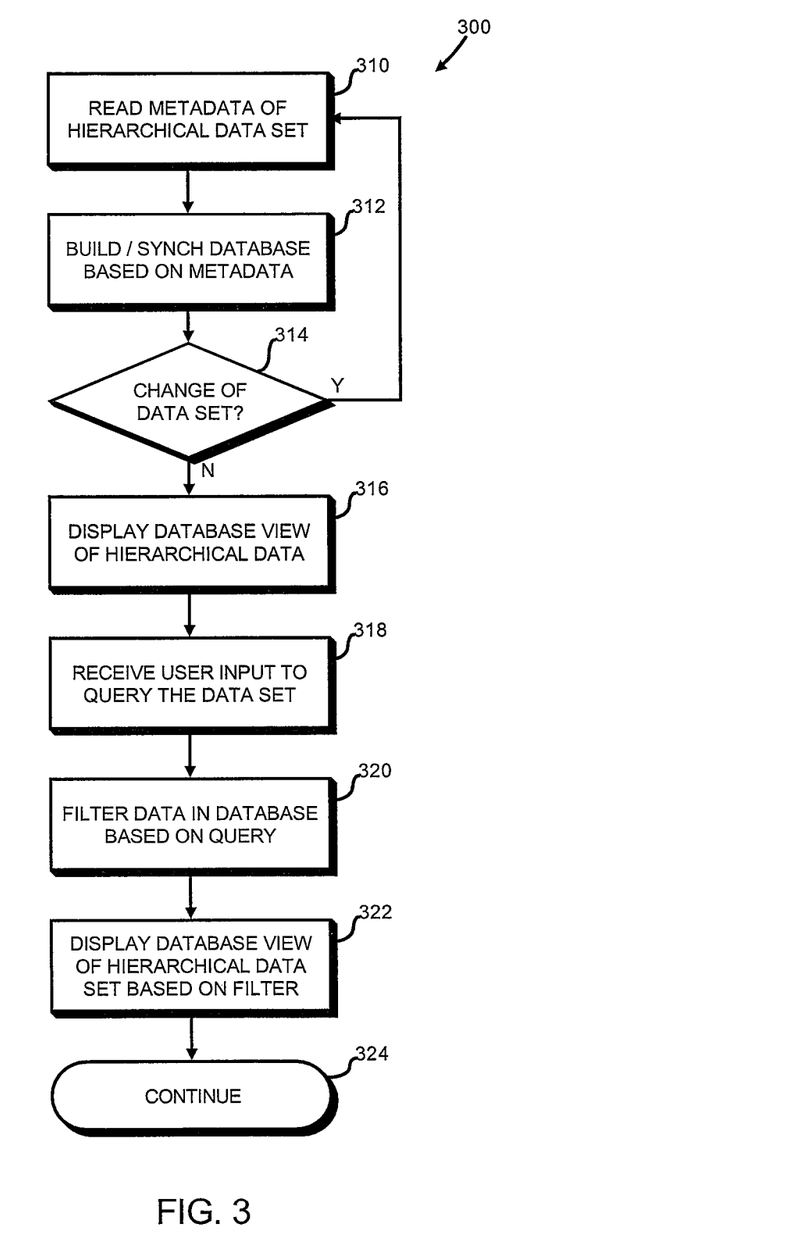
FIG. 3 is a flow diagram of a method for navigation of a hierarchical data set in accordance with one or more embodiments.

Referring now to FIG. 3, a flow diagram of a method for navigation of a hierarchical data set in accordance with one or more embodiments will be discussed. One particular order of the blocks of method 300 is shown in FIG. 3, however in other embodiments the blocks may be arranged in one or more other orders, and/or may include more or fewer blocks than shown in FIG. 3. Furthermore, method 300 may be tangibly embodied in a computer program and/or application or the like executed by a computing platform or other information handling system such as shown in and described with respect to FIG. 4, and the scope of the claimed subject matter is not limited in these respects.

At block 310, navigation application 110 may read metadata of hierarchical data set 112 from the items of hierarchical data set 112. At block 312, navigation application 110 may build database 118 on an initial creation of database 118, and/or may synchronize database 118 with hierarchical data set 112, for example if there have been any changes or updates to hierarchical data set. At block 314, a decision may be made whether any changes of hierarchical data set 112 have been made, and if so, such a synchronization of database 118 with hierarchical data set 112 may occur. Otherwise, in one or more embodiments, at block 316, hierarchical data set may 112 may be displayed in a database type view 128, for example by displaying the contents of database 118. Such a database type view 128 of hierarchical data set 112 may occur via passing of information in database 118 to user interface 122 or a target application such as application 210 or the like by navigation application 110.

At block 318, a user input to query and/or to otherwise navigate hierarchical data set 112 may be received, for example by user interface 122 and/or the target application such as application 210 or the like. At block 320, navigation application 110 may then filter the data in database view 128 of hierarchical data set 112 based at least in part on the query received as user input, and cause user interface 122 and/or the target application to display a filtered database view 128 of hierarchical data set 112 at block 322 based at least in part on the filter operation 126 performed by navigation application 110. Method 300 may continue a block 324 from which method 300 may continue at one or more other blocks of method 300. For example, further additional filtering may be provided by navigation application 110 in response to additional queries received as user input from a user which may result in a further narrowing of the information displayed in filtered database view 128 of hierarchical data set 112, although the scope of the claimed subject matters is not limited in these respects.

Figure 4:
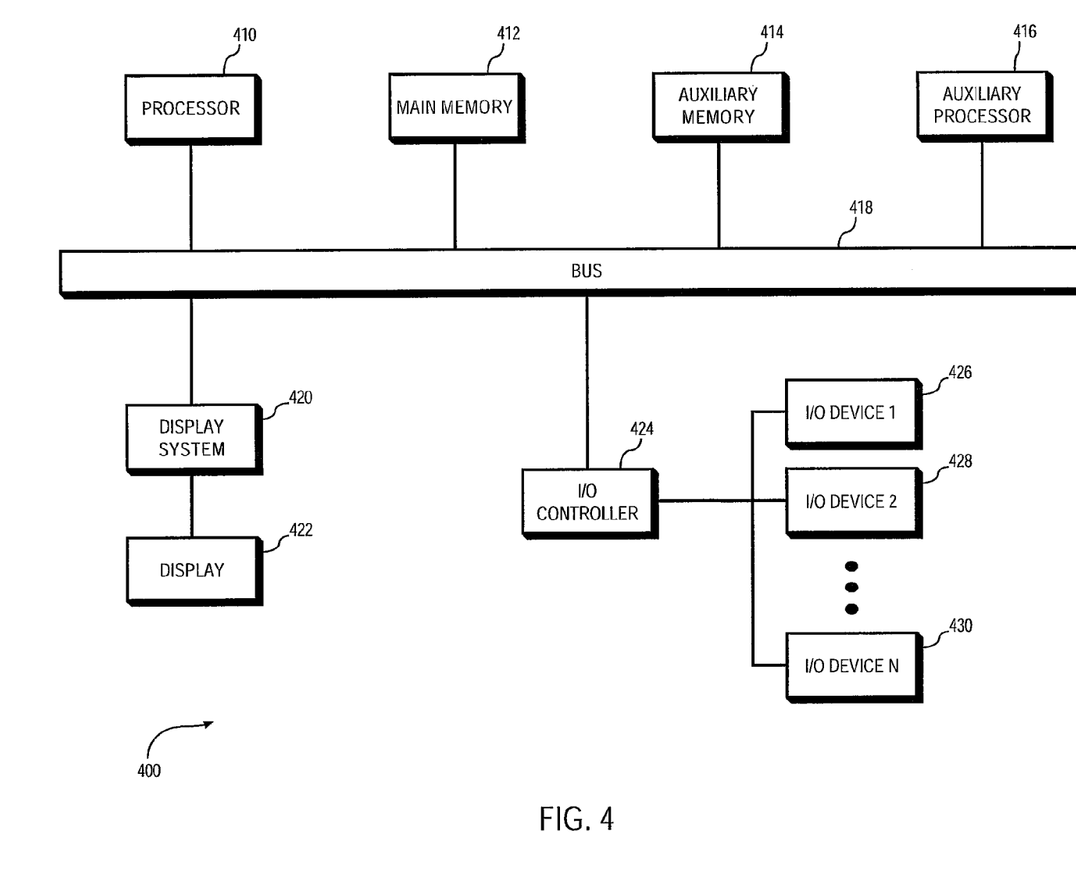
FIG. 4 is a block diagram of an information handling system capable of navigation of a hierarchical data set in accordance with one or more embodiments.

Referring now to FIG. 4, a block diagram of an information handling system capable of navigation of a hierarchical data set in accordance with one or more embodiments will be discussed. It should be noted that information handling system 400 of FIG. 4 is merely one type of computing platform, and other computing platforms having more and/or fewer components than shown in FIG. 4 may be implemented, and the scope of claimed subject matter is not limited in this respect. In one or more embodiments, information handling system 400 may be utilized to implement method 300 of FIG. 3 in whole and/or in part using more and/or fewer blocks than shown in FIG. 3, and the scope of claimed subject matter is not limited in this respect.

Information handling system 400 as shown in FIG. 4 may tangibly embody a computing platform on which navigation application 110 and/or user interface or target application 122 of FIG. 1, or application 210 and/or graphical user interface 212 of FIG. 2, may be executed to implement method 300 of FIG. 3. Such programs, applications, modules and/or machine readable instructions or the like may be tangibly stored on a computer and/or machine readable medium such as a compact disk (CD), digital versatile disk (DVD), flash memory, read-only memory type memory, hard disk drive (HDD), and so on. Information handling system 400 as shown in FIG. 4 may represent one embodiment of such a computing platform, wherein information handling system 400 may include fewer and/or more blocks to implement various types of computing platforms as desired, and the scope of the claimed subject matter is not limited in this respect.

As shown in FIG. 4, information handling system 400 may be controlled by processor 410. Processor 410 may comprise a central processing unit such as a microprocessor or microcontroller for executing programs, performing data manipulations and controlling the tasks of information handling system 400. Communication with processor 400 may be implemented via bus 418 for transferring information among the components of information handling system 400. Bus 418 may include a data channel for facilitating information transfer between storage and other peripheral components of information handling system 400. Bus 418 further may provide a set of signals utilized for communication with processor 410, including, for example, a data bus, and address bus, and/or a control bus. Bus 418 may comprise any bus architecture according to promulgated standards, for example industry standard architecture (ISA), peripheral component interconnect (PCI) type local bus, Universal Serial Bus (USB), standards promulgated by the Institute of Electrical and Electronics Engineers (IEEE) including IEEE 488 general-purpose interface bus (GPIB), IEEE 696/S-100, and so on, although the scope of the claimed subject matter is not limited in this respect.

Other components of information handling system may include, for example, main memory 412, and/or auxiliary memory 414. Information handling system 400 may further comprise auxiliary processing processor 416, which may be another processor, a digital signal processor, and so on. Main memory 412 may provide storage of instructions and data for programs to be executed by processor 410. Main memory 412 may be, for example, semiconductor-based memory such as dynamic random access memory (DRAM) and/or static random access memory (SRAM), and/or the like. Other semiconductor-based memory types may include, for example, synchronous dynamic random access memory (SDRAM), Rambus dynamic random access memory (RDRAM), ferroelectric random access memory (FRAM), polymer type memory, and so on. Auxiliary memory 414 may be utilized to store instructions and/or data that to be loaded into main memory 412 before execution. Auxiliary memory 414 may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memory 414 may also include any type of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well. Information handling system 400 optionally include auxiliary processor 416 which may be an auxiliary processor to manage input/output, an auxiliary processor to perform floating point mathematical operations, a digital signal processor and/or any special-purpose microprocessor having an architecture suitable for fast execution of signal processing algorithms, a back-end processor and/or any subordinate type processor subordinate to processor 410, an additional microprocessor and/or controller for dual and/or multiple processor systems, and/or a coprocessor and/or additional processor. Such auxiliary processors may be discrete processors and/or or may be arranged in the same package as processor 410, for example in a multicore and/or multithreaded processor, however the scope of the claimed subject matter is not limited in these respects.

Information handling system 400 further may include display system 420 for connecting to display 422, and further may include input/output (I/O) controller 424 to connect to one or more I/O devices including, for example, I/O device 426, I/O device 428, up to an Nth I/O device, I/O device 430. Display system 420 may comprise a video display adapter having components for driving display 422, including, for example, video memory, a buffer, and/or a graphics engine. Such video memory may be, for example, video random access memory (VRAM), synchronous graphics random access memory (SGRAM), windows random access memory (WRAM), and/or the like. Display 422 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth. Input/output controller 424 may comprise one or more controllers and/or adapters to prove interface functions between one or more of I/O device 426, I/O device 428, and/or I/O device 430. For example, input/output controller 424 may comprise a serial port, parallel port, universal serial bus (USB) port, an IEEE 1394 serial bus port, infrared port, network adapter, printer adapter, radio-frequency (RF) communications adapter, universal asynchronous receiver-transmitter (UART) port, and/or the like, to interface between corresponding I/O devices such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electro-acoustic transducer, microphone, speaker, audio amplifier, and/or the like. Input/output controller 424 and/or I/O device 426, I/O device 428, and/or I/O device 430 may provide and/or receive analog and/or digital signals to communicate between information handling system and external devices, networks, and/or information sources. Input/output controller 424 and/or I/O device 426, I/O device 428, and/or I/O device 430 may implement industry promulgated architecture standards, including, for example, Ethernet IEEE 802 type standards, such as IEEE 802.3 for broadband and/or baseband networks, IEEE 802.3z for Gigabit Ethernet, IEEE 802.4 for token passing bus networks, IEEE 802.5 for token ring networks, IEEE 802.6 for metropolitan area networks and/or the like, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. Information handling system 400 of FIG. 4 is merely one example of an information handling system and/or computing platform, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to navigation of hierarchical data set and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    accessing a database, wherein the database is based at least in part on a hierarchical data set comprising data items organized according to a file system hierarchy;
    analyzing the hierarchical data set to determine one or more filterable items based on intrinsic and extrinsic metadata of one or more data items of the hierarchical data set;
    displaying the one or more data items in a database view;
    displaying the one or more filterable items organized under one or more categories in a display area adjacent to the displayed database view, wherein the one or more categories are dynamically generated based at least in part on the intrinsic and extrinsic metadata such that, if none of the one or more data items falls under a given category, the given category is not displayed;
    filtering the database view in response to a selection of a filterable item, wherein the filtering comprises removing at least one of the one or more data items from the database view; and
    in response to removing the at least one of the one or more data items from the database view, removing one or more corresponding filterable items from the display area adjacent to the displayed database view.

2. The method as claimed in claim 1, further comprising:
    determining whether there is a change in the hierarchical data set;
    updating the database to reflect the change in the hierarchical data set; and
    displaying an updated database view of the hierarchical data set based at least in part on the change.

3. The method as claimed in claim 1, wherein said displaying the one or more data items in the database view comprises displaying content of one or more directories and content of one or more subdirectories simultaneously in the database view.

4. The method as claimed in claim 1, wherein the data items comprise one or more of an image file, an audio file, an audio-video file, or combinations thereof.

5. The method as claimed in claim 1, wherein data items not meeting the selection of one or more filterable items are not displayed in the database view.

6. The method as claimed in claim 1, further comprising, in response to removing the at least one of the one or more data items from the database view, removing one or more corresponding categories from the display area adjacent to the displayed database view.

7. The method as claimed in claim 1, further comprising filtering the database view one or more additional times in response to one or more additional selections of one or more additional filterable items, wherein a further filtered portion of the hierarchical data set is displayed in the database view according to the one or more additional selections.

8. The method as claimed in claim 1, further comprising unfiltering the database view of the hierarchical data set in response to a deselection of one or more of the filterable items, wherein a less filtered portion of the hierarchical data set is displayed in the database view to reflect the deselection.

9. The method as claimed in claim 1, further comprising periodically synchronizing the database with the hierarchical data set to reflect a current state of the hierarchical data set in the database view of the hierarchical data set without requiring an import.

10. A system comprising:
one or more computing devices configured to perform operations including:
accessing a database, wherein the database based at least in part on a hierarchical data set;
analyzing the hierarchical data set to identify one or more filterable items based on intrinsic and extrinsic metadata of one or more data items of the hierarchical data set;
displaying the one or more data items in a database view;
displaying the one or more filterable items organized under one or more categories, wherein the one or more categories are dynamically determined based at least in part on the intrinsic and extrinsic metadata such that, if none of the identified one or more filterable items belongs in a given category, the given category is not displayed;
filtering the database view in response to a selection of a filterable item, wherein filtering the database view comprises removing at least one data item from the database view; and
removing a filterable item from the display area adjacent to the displayed database view that corresponds to the at least one of the one or more data items removed from the database view.

11. The system as claimed in claim 10, wherein the instructions are further executable to:
determine whether there is a change in the hierarchical data set;
update the database to reflect the change in the hierarchical data set; and
display an updated database view of the hierarchical data set based at least in part on the change.

12. The system as claimed in claim 10, wherein the operations further comprise displaying content of one or more directories and content of one or more subdirectories simultaneously in the database view.

13. The system as claimed in claim 10, the operations further comprising removing a category from the display area adjacent to the displayed database view that corresponds to the at least one of the one or more data items removed from the database view.

14. The system as claimed in claim 10, wherein the one or more data items comprise one or more of an image file, an audio file, an audio-video file, or combinations thereof.

15. The system as claimed in claim 10, wherein the operations further comprise removing data items not meeting the selection of one or more filterable items from the database view.

16. The system as claimed in claim 10, wherein the operations further comprise:
executing said filtering one or more additional times in response to one or more additional selections of one or more additional filterable items, wherein a further filtered portion of the hierarchical data set is displayed in the database view according to the one or more additional selections.

17. The system as claimed in claim 10, wherein the operations further comprise:
unfiltering the database view in response to a deselection of one or more of the filterable items, wherein a less filtered portion of the hierarchical data set is displayed in the database view to reflect the deselection.

18. The system as claimed in claim 10, wherein the operations further comprise periodically synchronizing the database with the hierarchical data set to reflect a current state of the hierarchical data set in the database view without requiring an import.

19. An apparatus, comprising:
means for accessing a database, wherein the database is based at least in part on a hierarchical data set;
means for analyzing the hierarchical data set to determine one or more filterable items based on intrinsic and extrinsic metadata of one or more data items of the hierarchical data set;
means for displaying the one or more data items in a database view;
means for displaying the one or more filterable items organized under one or more categories in a display area adjacent to the displayed database view of the hierarchical data set, wherein the one or more categories are determined based at least in part on the intrinsic and extrinsic metadata such that, if none of the one or more data items fall under a given category, the given category is not displayed;
means for filtering the database view in response to a selection of a filterable item, wherein filtering the database view comprises removing at least one of the one or more data items from the database view; and
removing one or more filterable items from the display area adjacent to the displayed database view corresponding to the at least one of the one or more data items removed from the database view.

20. The apparatus as claimed in claim 19, further comprising:
means for determining whether there is a change in the hierarchical data set;
means for updating the database to reflect the change in the hierarchical data set; and
means for displaying an updated database view of the hierarchical data set based at least in part on the change.

21. The apparatus as claimed in claim 19, wherein said means for displaying the one or more data items in the database view comprises means for displaying content of one or more directories and content of one or more subdirectories simultaneously in the database view.

22. The apparatus as claimed in claim 19, further comprising means for removing one or more corresponding categories from the display area adjacent to the displayed database view corresponding to the at least one of the one or more data items removed from the database view.

23. The apparatus as claimed in claim 19, wherein the one or more data items comprise one or more of an image file, an audio file, an audio-video file, or combinations thereof.

24. The apparatus as claimed in claim 19, wherein data items not meeting the selection of one or more filterable items are not displayed in the database view.

25. The apparatus as claimed in claim 19, further comprising:
   means for directing said means for filtering to operate one or more additional times in response to one or more additional selections of one or more additional filterable items, wherein a further filtered portion of the hierarchical data set is displayed in the database view according to the one or more additional selections.

26. The apparatus as claimed in claim 19, further comprising:
   means for unfiltering the database view of the hierarchical data set in response to a deselection of one or more of the filterable items, wherein a less filtered portion of the hierarchical data set is displayed in the database view to reflect the deselection.

27. The apparatus as claimed in claim 19, further comprising:
   means for periodically synchronizing the database with the hierarchical data set to reflect a current state of the hierarchical data set in the database view of the hierarchical data set without requiring an import.

* * * * *